Patented Jan. 7, 1936

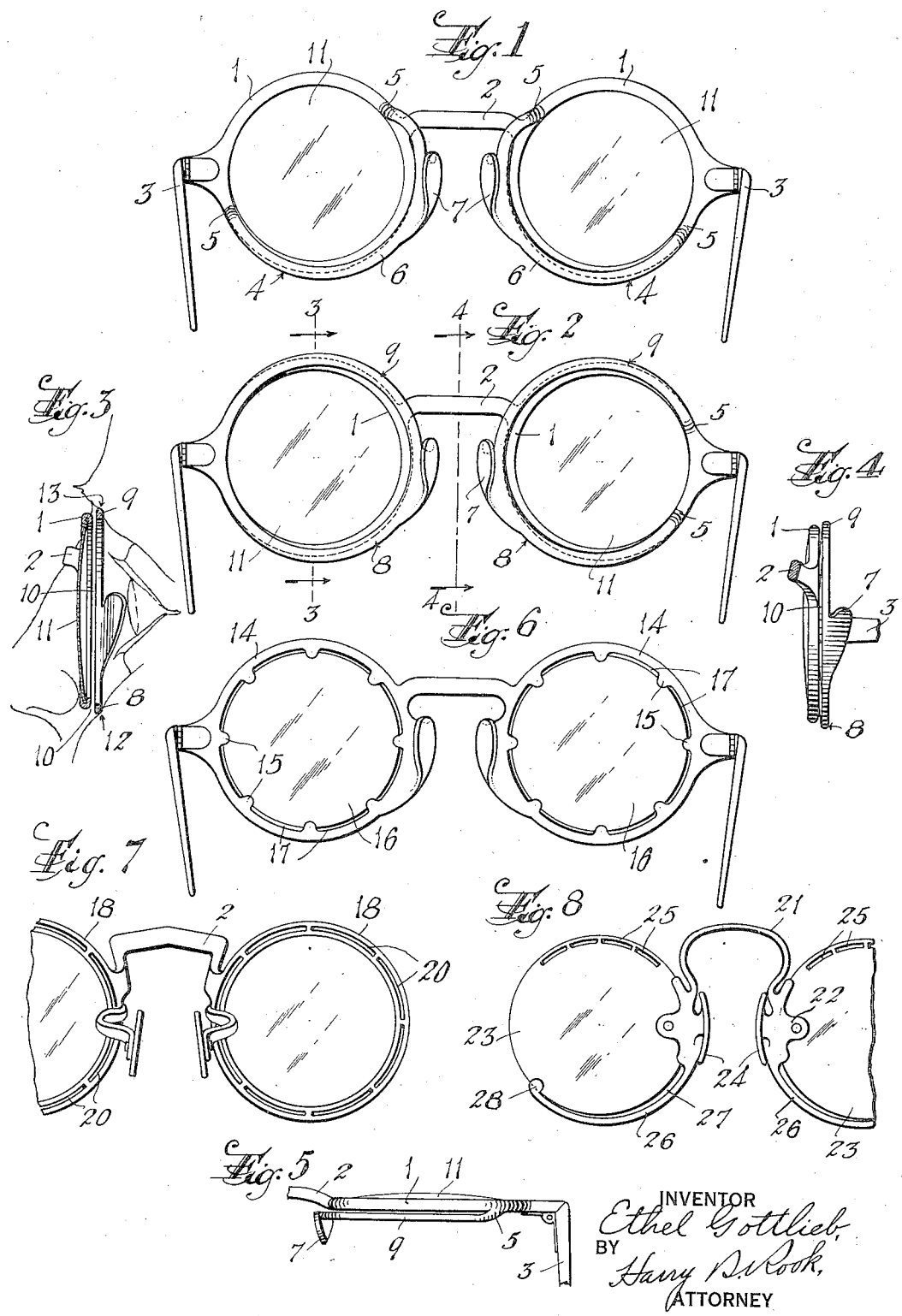

2,027,037

UNITED STATES PATENT OFFICE 2,027,037

VENTILATED SPECTACLES OR EYEGLASSES

Ethel Gottlieb, Newark, N. J.

Application January 9, 1933, Serial No. 650,745

2 Claims. (Cl. 88—41)

As is well known, the lenses or ophthalmic mounting of spectacles and eyeglasses often contact with or are disposed in closely spaced relation to certain areas of the face of the wearer, such as the cheeks and the super-orbital arches; and in such cases when the face perspires and the lenses are relatively cool, or when the lenses are worn from a cold atmosphere into a warm moist atmosphere, moisture condenses on the sides of the lenses next to the face and especially at areas thereof at or adjacent the points of contact of the lenses or ophthalmic mountings with the face, so that the lenses or portions thereof become clouded so as to seriously interfere with vision therethrough.

The prime object of my invention is to provide novel and improved means to prevent or reduce such condensation of moisture on the lenses of spectacles or eyeglasses.

I have discovered that if a free circulation of air can be provided over the whole surface of the lens between the lens and the face of the wearer, such condensation of moisture can be inhibited or materially reduced, and therefore another object of the invention is to provide novel and improved means for ensuring a free circulation of air over the whole surface of the lens between the lens and the face of the wearer, so as to inhibit or reduce the condensation of moisture on and consequent "clouding" of the lenses.

A further object is to provide a spectacle or eyeglass or an ophthalmic mounting embodying novel and improved means for holding in spaced relation to the face of the wearer the portions of the spectacle or eyeglass lens or ophthalmic mounting which except for said means would normally contact with or be located in close proximity to the face, so as to ensure a free circulation of air between said portions of the spectacle, eyeglass, or mounting and the face.

Other objects are to provide a spectacle or eyeglass lens or an ophthalmic mounting having openings at the portion thereof to be located closely adjacent to or in contact with the face of the wearer to permit circulation of air through said openings into the space between said lens or ophthalmic mounting and the face of the wearer; to provide a novel and improved combination of a spectacle or eyeglass lens or an ophthalmic mounting, and a guard to contact with the face of the wearer to provide a space or opening between said guard and the periphery of said lens or said ophthalmic mounting and ensure circulation of air through said space between said lens or said mounting and the face of the wearer; and to obtain other advantages and results as will be brought out by the following description.

Referring to the accompanying drawing in which corresponding and like parts are designated throughout the specification by the same reference characters, Figure 1 is a rear elevation of ventilated spectacles or eyeglasses, including ophthalmic mountings, embodying my invention.

Figure 2 is a similar view showing a modification of the invention.

Figure 3 is a transverse vertical sectional view on the line 3—3 of Figure 2.

Figure 4 is a similar view on the line 4—4 of Figure 2.

Figure 5 is a top plan view of one of the lens receiving frames and corresponding guard illustrated in Figure 2.

Figure 6 is a view similar to Figure 1 showing another form of spectacles, eyeglasses and ophthalmic mountings.

Figure 7 is a similar view of a further modification of the invention, and

Figure 8 is a rear view of another modified form of the invention.

Specifically describing the embodiment of the invention illustrated in Figure 1, the spectacles comprise an ophthalmic mounting including two lens-receiving rims 1 having lenses 11 therein and being formed of any suitable material, for example, a composition in imitation of tortoise shell. These lens receiving rims are connected by a bridge 2, and temples 3 are hingedly connected to the lens-receiving rims in the usual manner.

In accordance with the invention, each of the lens receiving rims has an arcuate guard 4 which has its ends connected to the corresponding rim as indicated at 5, preferably integrally and at opposite sides of the temple 3. The intermediate portions of the guard are disposed in spaced relation to the lens-receiving rim and extend around the portion of the rim which except for the guard would contact with the cheek and corresponding side of the nose or be disposed in closely adjacent relation to such areas of the face. Preferably the guards 4 are disposed at the sides of the rims which are to be next to the face of the wearer when the spectacles or mountings are worn, and the guard may be of the same diameter as the rim, or slightly greater in diameter so as to extend beyond the periphery of the rim as shown in the drawing. Each guard has a nose piece 7 connected thereto, preferably integrally, to contact with the sides of the nose and support the spectacles thereon.

A slightly modified form of the invention is shown in Figure 2 of the drawing, where the guards 8 are in general of the same construction and arrangement as the guards 4, the main difference between this form of the invention and that illustrated in Figure 1 being that the guards extend along the upper or super-orbital portions of the lens-receiving rims as indicated at 9.

When spectacles constructed as above described are applied to the face of a wearer, the guards 4 or 8 engage the areas of the face which except for said guards would be directly contacted by the peripheries of the lens-receiving rims 1, so that the lens-receiving rims are held in spaced relation to the face throughout the peripheries of the rims, and spaces 10 are provided between the rims and the face of the wearer for passage of air between the face and the lenses 11. This construction is important in that it permits of a free circulation of air throughout the vision areas of the lenses between the lenses and the face of the wearer. While known types of spectacles or ophthalmic mountings provide passages for air between some portions of the lenses or lens-receiving rims and the face of the wearer, for example at the temple areas of the face, there are generally other portions of the lenses or lens-receiving rims contacting with the face of the wearer or in close relation thereto so as to prevent a free circulation of air over the portions of the vision areas of the lenses adjacent such points of contact of the lenses or lens-receiving rims with the face. Accordingly, in known types of spectacles and ophthalmic mountings where such conditions obtain, the sides of the lenses adjacent the face frequently become clouded by condensation of moisture on the lenses, while with my invention such condensation of moisture is prevented by the free circulation of air over the lenses.

In Figure 3 of the drawing, which shows the form of the invention illustrated in Figure 2, applied to a face it will be observed that the guards 8 contact with the cheeks of the face, as indicated at 12 and with the super-orbital arch areas of the face as indicated at 13, but a free passage of air behind the lenses is provided by the spaces 10 between the guards and the lens-receiving rims 1. The guards 8 may also contact with the sides of the nose, but a free passage of air will be provided across the lenses by the spaces 10 between the guards and the rims. The guards are not necessary at the outer or temple portions of the rims, since under all conditions these portions of the rims are relatively distantly spaced from the face.

A further modification of the invention is shown in Figure 6 of the drawing, where the lens-receiving rims 14 have circumferentially spaced lugs 15 on their inner peripheries in which are mounted the lenses 16 so as to provide circumferentially spaced openings or slots 17 between the peripheries of the lenses and the inner peripheries of the rims. Should any portions of the rims contact with the face of the wearer, free circulation of air behind the lenses will be ensured by the openings or slots 17.

A somewhat similar form of the invention is shown in Figure 7 of the drawing where the invention is embodied in so-called nose glasses, that is, glasses supported only on the nose. Here, the lens-receiving rims 18 have circumferentially spaced slots 20 which are disposed between the outer peripheries of the lenses and the outer peripheries of the rims, so as to ensure free passage of air behind the lenses at any point where the rims may contact with the face of the wearer.

Figure 8 illustrates another modification of the invention wherein the invention is embodied in so-called rimless glasses which comprise a nose bridge 21 to opposite ends of which, as at 22, are connected the lenses 23. The nose bridge also has nose pieces 24 to engage the sides of the nose, the glasses being retained in position on the face by the spring clamping action of the bridge and nose pieces on the nose. The upper or super-orbital portions of the lenses are provided with circumferentially spaced slots 25 so that should said edges of the lenses engage the super-orbital arch areas of the face air may freely pass through said slots between the lenses and the face, the upper edges of the lenses outwardly of said openings form guard portions to contact with the face.

The nose bridge 21 is also shown as provided with guard extensions 26 which extend along the lower or cheek portions of the lenses so as to provide space 27 between the guards and said edges of the lenses. The guards 26 may contact with the cheeks of the wearer, but the spaces 27 will permit a free passage of air between the cheeks and the lenses. For convenience, the outer ends of the guards 27 may be bifurcated at 28 to straddle the edges of the lenses so as to reenforce the ends of the guards and the attachment of the lenses to the nose bridge.

It will be observed that in the forms of the invention illustrated in Figures 1 to 5 inclusive, the guards 4 and 8 provide more or less resiliency for the nose pieces 7 whereby the spectacles can be more comfortably adjusted to the face.

In all forms of the invention, the guard portions of the mounting have a predetermined fixed relation to the lenses so that regardless of the position of the lens relative to the face, a passage for air between the guard portion and the lens will always be provided. Also, each guard portion is disposed in the same plane with or on a plane approximately parallel and closely adjacent to the lens, whereby the guard shall not affect the proper focusing position of the lens on the face of the wearer, nor detrimentally affect the appearance of the mounting.

While I have shown several different forms of my invention, it should be understood that this is primarily for the purpose of illustrating the principles of the invention and that many modifications and changes may be made in the details of construction without departing from the spirit or scope of the invention. The invention may be embodied in any type of spectacles, eyeglasses or ophthalmic mountings, and I do not desire to be limited in the construction and use of the invention, except as required by the following claims when construed in the light of the prior art.

Having thus described my invention, what I claim is:

1. A mounting for spectacles or eyeglasses comprising two lens-receiving rims, and a bridge connecting said rims, each of said rims having an arcuate guard therefor to contact with the portions of the face of the wearer closest to the rim when the spectacles or eyeglasses are worn and having only its ends connected to the rim at spaced points circumferentially thereof and its intermediate portions in closely spaced relation and in a plane approximately parallel to the plane of the rim, the guard extending around that portion of the rim to be adjacent the cheek and nose to provide a passage for air between the face of the wearer and lens in said rim and prevent condensation of moisture on the lens, and a nose rest on said guard to contact with the nose of the wearer.

2. A mounting for spectacles or eyeglasses comprising two lens-receiving rims, and a bridge connecting said rims, each of said rims having an arcuate guard therefor to contact with the portions of the face of the wearer closest to the rim when the spectacles or eyeglasses are worn and having only its ends connected to the rim at spaced points circumferentially thereof and its intermediate portions in closely spaced relation and in a plane approximately parallel to the plane of the rim, the guard extending around that portion of the rim to be adjacent the cheek and nose to provide a passage for air between the face of the wearer and lens in said rim and prevent condensation of moisture on the lens, a nose rest on said guard to contact with the nose of the wearer, and a temple bar connected to each rim between the ends of said guard.

ETHEL GOTTLIEB.